US012581005B2

(12) United States Patent
Seo et al.

(10) Patent No.: US 12,581,005 B2
(45) Date of Patent: Mar. 17, 2026

(54) DISPLAY DEVICE

(71) Applicant: Samsung Display Co., Ltd., Yongin-si (KR)

(72) Inventors: Eunwon Seo, Yongin-si (KR); Joon-Ik Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 191 days.

(21) Appl. No.: 18/361,232

(22) Filed: Jul. 28, 2023

(65) Prior Publication Data

US 2024/0137433 A1    Apr. 25, 2024
US 2024/0236220 A9    Jul. 11, 2024

(30) Foreign Application Priority Data

Oct. 20, 2022    (KR) ........................ 10-2022-0135893

(51) Int. Cl.
| | |
|---|---|
| *G06F 1/16* | (2006.01) |
| *G09F 9/00* | (2006.01) |
| *G09F 9/30* | (2006.01) |
| *H04M 1/02* | (2006.01) |

(52) U.S. Cl.
CPC ........ *H04M 1/0268* (2013.01); *G06F 1/1652* (2013.01); *G09F 9/301* (2013.01)

(58) Field of Classification Search
CPC ............ H04M 1/0268; H04M 1/0214; H04M 1/0237; G06F 1/1652; G06F 1/1637; G06F 1/1641; G09F 9/301; G09F 9/30; H10K 50/84; H10K 2102/311
See application file for complete search history.

(56) References Cited

U.S. PATENT DOCUMENTS

| | | | | |
|---|---|---|---|---|
| 6,741,087 B2* | 5/2004 | Kimura | ..................... | H01J 9/02 |
| | | | | 29/874 |
| 9,313,884 B2* | 4/2016 | Chabrecek | ............. | H10K 77/10 |
| 9,639,121 B2* | 5/2017 | Min | ....................... | H05K 1/038 |
| 9,826,629 B2 | 11/2017 | Choi et al. | | |
| 10,602,631 B2 | 3/2020 | Song et al. | | |
| 12,162,255 B2* | 12/2024 | Cheng | ........................ | B32B 3/14 |
| 2009/0166877 A1* | 7/2009 | Lifka | .................... | H10K 59/179 |
| | | | | 257/773 |
| 2019/0179445 A1* | 6/2019 | Moon | .................. | G09G 3/2003 |
| 2019/0207141 A1* | 7/2019 | Kim | ...................... | H10K 77/111 |
| 2020/0161572 A1* | 5/2020 | Zheng | .................... | H10K 50/11 |
| 2020/0190277 A1* | 6/2020 | Hou | .......................... | C08J 5/043 |
| 2022/0007528 A1* | 1/2022 | Kim | ....................... | G06F 1/1681 |
| 2022/0312601 A1* | 9/2022 | Zhu | ...................... | H05K 5/0017 |

(Continued)

FOREIGN PATENT DOCUMENTS

| | | |
|---|---|---|
| CN | 113037893 | 6/2021 |
| KR | 10-2018-0062195 | 6/2018 |

(Continued)

*Primary Examiner* — Rockshana D Chowdhury
(74) *Attorney, Agent, or Firm* — Sughrue Mion, PLLC

(57) ABSTRACT

A display device includes a display panel including non-folding regions and a folding region disposed between the non-folding regions and a lower member disposed under the display panel. The lower member includes a base part including a plurality of portions having different flexural moduli and support lines that are disposed inside the base part and that intersect each other in a plan view and define openings.

19 Claims, 10 Drawing Sheets

(56) References Cited

U.S. PATENT DOCUMENTS

| | | | | |
|---|---|---|---|---|
| 2022/0321686 | A1 | 10/2022 | Lee | |
| 2022/0322542 | A1* | 10/2022 | Wu | G06F 1/1637 |
| 2023/0010332 | A1* | 1/2023 | Gong | B32B 7/022 |
| 2023/0049246 | A1* | 2/2023 | Wang | H10K 77/111 |
| 2023/0070431 | A1* | 3/2023 | Li | G06F 1/1652 |
| 2024/0284611 | A1* | 8/2024 | Li | H05K 5/0217 |
| 2024/0321148 | A1* | 9/2024 | Wang | G06F 1/1652 |
| 2024/0365653 | A1* | 10/2024 | Hamburgen | H10K 71/50 |

FOREIGN PATENT DOCUMENTS

| | | |
|---|---|---|
| KR | 10-2320382 | 11/2021 |
| KR | 10-2022-0138490 | 10/2022 |

* cited by examiner

DISPLAY DEVICE

CROSS-REFERENCE TO RELATED APPLICATIONS

This application claims priority under 35 U.S.C. § 119 to Korean Patent Application No. 10-2022-0135893 filed on Oct. 20, 2022, in the Korean Intellectual Property Office, the disclosures of which are incorporated by reference herein in their entireties.

BACKGROUND

1. Technical Field

Embodiments of the disclosure described herein relate to a foldable display device.

2. Description of the Related Art

Multimedia electronic devices, such as a television, a mobile phone, a tablet computer, a car navigation device, a game machine, and the like, may include a display device for displaying an image. The display device may include a display panel and a lower member that protects the display panel from an external impact.

With the development of display device technology, various flexible display devices that can be curved, folded, or rolled are being developed. The shape of a flexible display device may be diversely deformed. Thus, the flexible display device may be easy to carry and may improve user convenience. A lower member included in the flexible display device is required to be capable of a folding or bending operation and to have impact resistance sufficient to protect a display panel from an external impact.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

Embodiments of the disclosure provide a display device including a lower member that has impact resistance and folding characteristics and does not deteriorate surface quality of a display panel.

According to an embodiment, a display device includes a display panel including non-folding regions and a folding region disposed between the non-folding regions and a lower member disposed under the display panel. The lower member includes a base part including a plurality of portions having different flexural moduli and support lines that are disposed inside the base part and that intersect each other in a plan view and define openings.

The base part may include a first portion that overlaps the folding region, and a second portion and a third portion that overlap the non-folding regions, respectively. A flexural modulus of the first portion may be lower than a flexural modulus of each of the second portion and the third portion.

The base part may include a polymer resin.

The support lines may include at least one of stainless steel, titanium, aluminum, nickel, and an alloy thereof.

The support lines may be disposed in a central portion of the base part in a thickness direction.

The support lines may include first support lines, each extending in a first direction and second support lines, each extending in a second direction extending the first direction.

The first support lines and the second support lines may be alternately arranged in the first direction and the second direction respectively and forming a woven structure.

Each of the second support lines may form valleys and ridges on a vertical cross section taken along the second direction and viewed in the first direction, and the valleys and ridges of the second support lines may be alternately arranged in the first direction.

Each of the first support lines may be disposed through an upper portion of a valley and a lower portion of a ridge of second support lines that overlap each other among the second support lines.

Each of the first support lines may extend parallel to the second direction.

The first support lines may include centers that may be parallel to the second direction in the vertical cross section taken along the second direction.

Each of the first support lines may form valleys and ridges on a vertical cross section taken along the first direction and viewed in the second direction.

The first support lines may include centers that are adjacent to each other in the second direction and are not aligned with the second direction in the vertical cross section taken along the second direction.

The folding region may be folded about a folding axis that extends in the first direction.

The display device may further include a window module disposed on the display panel.

The display device may further include an input sensor that is disposed on the display panel and that senses an external input.

According to an embodiment, a display device includes a display panel including a folding region and a non-folding region and a lower member disposed on a rear surface of the display panel. The lower member includes support lines that overlap the folding region and the non-folding region and forming a mesh structure, the lower member further including and a base part that covers the support lines. The base part corresponding to the folding region has a lower flexural modulus than the base part corresponding to the non-folding region.

The support lines may include at least one of stainless steel, titanium, aluminum, nickel, and an alloy thereof.

The support lines may include first support lines, each extending in a first direction, the first support lines arranged in a second direction intersecting the first direction, and second support lines, each extending in the second direction, the second support lines arranged in the first direction.

Each of the second support lines may form valleys and ridges on a vertical cross section taken along the second direction and viewed in the first direction, and each of the first support lines may be disposed through an upper portion of a valley and a lower portion of a ridge of second support lines that overlap each other in the first direction.

BRIEF DESCRIPTION OF THE DRAWINGS

The above and other aspects and features of the disclosure will become more apparent by describing in detail embodiments thereof with reference to the attached drawings, in which.

FIG. 6A is a schematic perspective view of a lower member according to an embodiment of the disclosure.

FIG. 6B is a schematic sectional view of a lower member according to an embodiment of the disclosure.

FIG. 7A is a schematic perspective view of a lower member according to an embodiment of the disclosure.

FIG. 7B is a schematic sectional view of a lower member according to an embodiment of the disclosure.

DETAILED DESCRIPTION OF THE EMBODIMENTS

Figure 1:
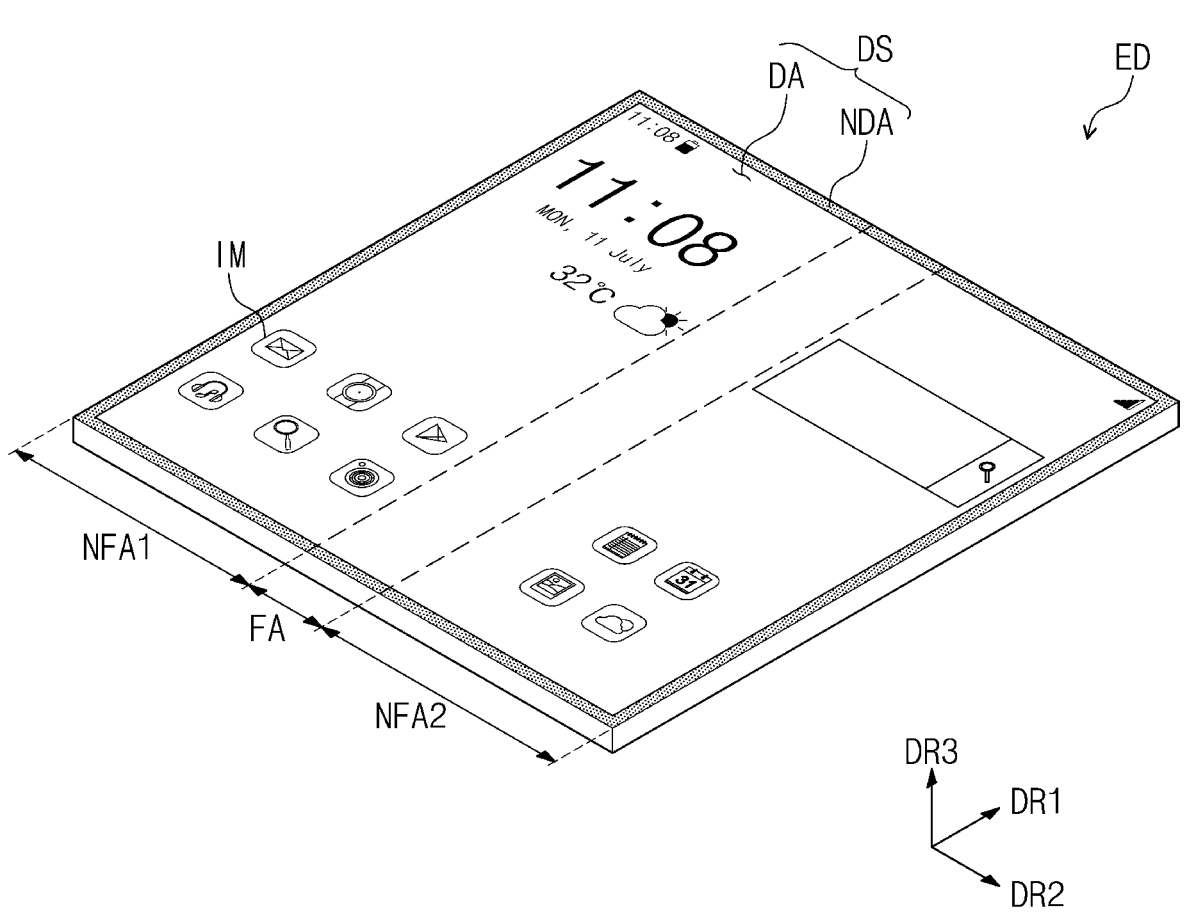
FIG. 1 is a schematic perspective view of a display device according to an embodiment of the disclosure.

The disclosure will now be described more fully hereinafter with reference to the accompanying drawings, in which embodiments are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

Various changes can be made to the disclosure, and various embodiments of the disclosure may be implemented. Thus, specific embodiments are illustrated in the drawings and described as examples herein. However, it should be understood that the disclosure is not to be construed as being limited thereto and covers all modifications, equivalents, and alternatives falling within the spirit and scope of the disclosure.

In the drawings, sizes, thicknesses, ratios, and dimensions of the elements may be exaggerated for ease of description and for clarity. Like numbers and/or reference characters refer to like elements throughout.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

It will be understood that, although the terms first, second, etc., may be used herein to describe various elements, these elements should not be limited by these terms. These terms are only used to distinguish one element from another element. For example, a first element may be referred to as a second element, and similarly, a second element may be referred to as a first element without departing from the scope of the disclosure.

As used herein, the singular forms, "a," "an," and "the" are intended to include the plural forms as well, unless the context clearly indicates otherwise.

In the specification and the claims, the phrase "at least one of" is intended to include the meaning of "at least one selected from the group of" for the purpose of its meaning and interpretation. For example, "at least one of A and B" may be understood to mean "A, B, or A and B."

The spatially relative terms "below", "beneath", "lower", "above", "upper", or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in other directions and thus the spatially relative terms may be interpreted differently depending on the orientations.

The terms "comprises," "comprising," "includes," and/or "including,", "has," "have," and/or "having," and variations thereof when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined or implied herein, all terms (including technical and scientific terms) used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that when an element (or a region, a layer, a portion, or the like) is referred to as "being on", "disposed on", "connected to" or "coupled to" another element in the specification, it can be directly disposed on, connected or coupled to another element mentioned above, or intervening elements may be disposed therebetween. It will be understood that the terms "connected to" or "coupled to" may include a physical or electrical connection or coupling.

In case that an element is referred to as being "in contact" or "contacted" or the like to another element, the element may be in "electrical contact" or in "physical contact" with another element; or in "indirect contact" or in "direct contact" with another element.

A description that a component is "configured to" perform a specified operation may be defined as a case where the component is constructed and arranged with structural features that can cause the component to perform the specified operation.

The terms "overlap", "overlapping", or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art.

The terms "face" and "facing" mean that a first element may directly or indirectly oppose a second element. In a case in which a third element intervenes between the first and second element, the first and second element may be understood as being indirectly opposed to one another, although still facing each other.

When an element is described as "not overlapping" or "to not overlap" another element, this may include that the elements are spaced apart from each other, offset from each other, or set aside from each other or any other suitable term as would be appreciated and understood by those of ordinary skill in the art.

The phrase "in a plan view" means viewing the object from the top, and the phrase "in a schematic cross-sectional view" means viewing a cross-section of which the object is vertically cut from the side. Hence, the expression "in a plan view" used herein may mean that an object is viewed in a third direction DR3 from the top. The phrase "in a schematic cross-sectional view" means viewing a cross-section in a first direction DR1 or a second direction DR2 of which the object is vertically cut from the side. The direction DR3 also can be referred to as a "thickness direction".

Embodiments may be described and illustrated in the accompanying drawings in terms of functional blocks, units, and/or modules.

Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies.

In the case of the blocks, units, and/or modules being implemented by microprocessors or other similar hardware, they may be programmed and controlled using software (for example, microcode) to perform various functions discussed herein and may optionally be driven by firmware and/or software.

It is also contemplated that each block, unit, and/or module may be implemented by dedicated hardware, or as a combination of dedicated hardware to perform some functions and a processor (for example, one or more programmed microprocessors and associated circuitry) to perform other functions.

Each block, unit, and/or module of embodiments may be physically separated into two or more interacting and discrete blocks, units, and/or modules without departing from the scope of the disclosure.

Further, the blocks, units, and/or modules of embodiments may be physically combined into more complex blocks, units, and/or modules without departing from the scope of the disclosure.

Hereinafter, a display device according to an embodiment of the disclosure will be described with reference to the accompanying drawings.

Figure 2A:
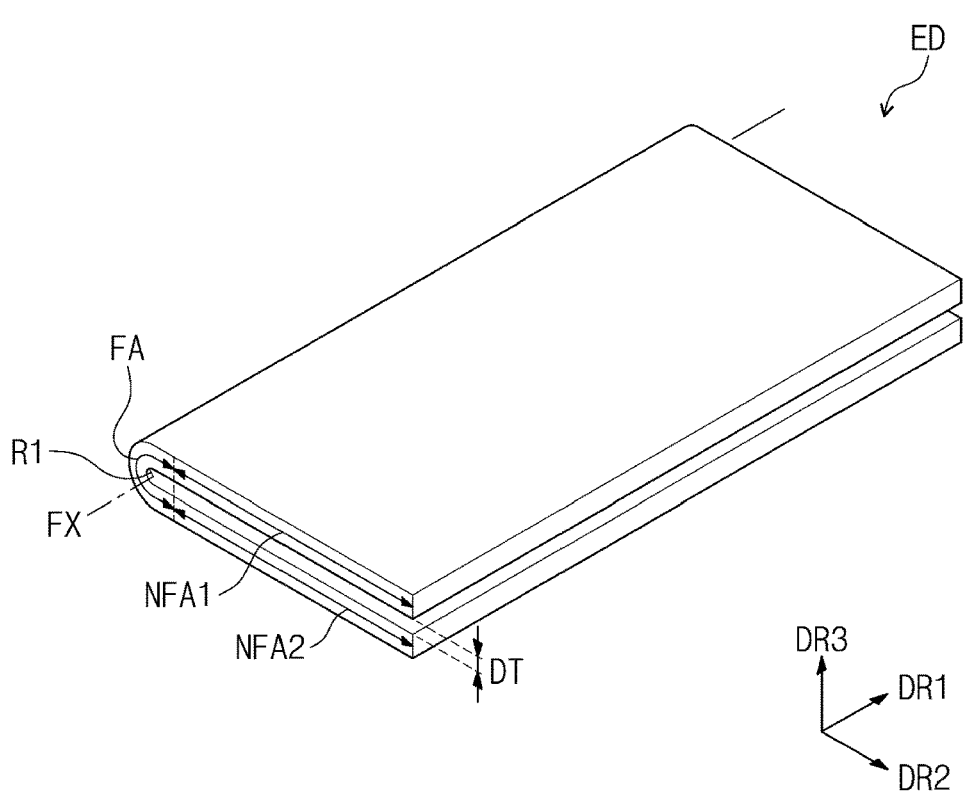
FIGS. 2A and 2B are schematic perspective views of a folded display device according to an embodiment of the disclosure.
Figure 2B:
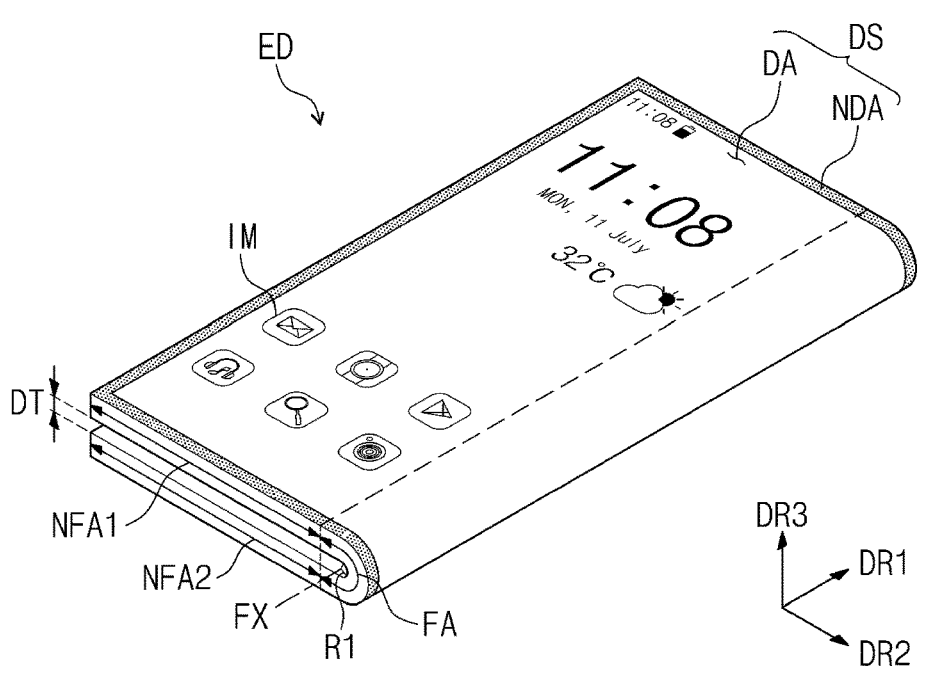

FIG. 1 is a schematic perspective view of a display device ED according to an embodiment of the disclosure. FIGS. 2A and 2B are perspective views of a folded display device ED according to an embodiment of the disclosure.

The display device ED may be a device that is activated in response to an electrical signal and that displays an image IM. For example, the display device ED may be included in a small or medium-sized device, such as a monitor, a mobile phone, a tablet computer, a car navigation device, a game machine, or the like, as well as a large-sized device, such as a television, a billboard, or the like. However, the aforementioned examples of the display device ED are illustrative, and the display device ED is not limited to any one device as long as it does not deviate from the spirit and scope of the disclosure. In this embodiment, a mobile phone is illustrated as an example of the display device ED.

The display device ED according to an embodiment may be a flexible display device. The term "flexible" used herein may refer to a property of being bent and may include everything from a structure that can be fully folded to a structure that can be bent to a level of several nanometers. For example, the flexible display device ED may include a slidable display device, a rollable display device, a curved display device, or a foldable display device, or a combination thereof. In this embodiment, a foldable display device is illustrated as an example of the flexible display device ED.

FIG. 1 illustrates a schematic perspective view of the display device ED in a flat state (or, an unfolded state). Referring to FIG. 1, the display device ED may have a rectangular shape in a plan view with sides extending in a first direction DR1 and a second direction DR2: the second direction DR2 may be perpendicular to the first direction DR1, and the second direction DR2 also may be perpendicular is to a third direction DR3; the third direction DR3 may be perpendicular to the first direction DR1 and the second direction DR2. However, without being limited thereto, the display device ED may have various shapes, such as a circular shape, a polygonal shape, and the like, in a plan view.

The display device ED in the flat state may display the image IM in the third direction DR3 on a display surface DS parallel to the first direction DR1 and the second direction DR2. A front surface (or, an upper surface) and a rear surface (or, a lower surface) of each of members constituting the display device ED may be opposite each other in the third direction DR3, and the normal directions of the front surface and the rear surface may be substantially parallel to the third direction DR3.

The separation distance between the front surface and the rear surface defined in the third direction DR3 may correspond to the thickness of the member. The expression "in a plan view" used herein may mean that it is viewed in the third direction DR3. The expression "on a section" used herein may mean that it is viewed in the first direction DR1 or the second direction DR2. A schematic cross-sectional view is an example of a section viewed in the first direction DR1 or the second direction DR2. The directions indicated by the first, second, and third directions DR1, DR2, and DR3 may be relative and may be changed to different directions.

The display surface DS on which the image IM is displayed may correspond to a front surface of the display device ED. The image IM provided by the display device ED may include a still image as well as a dynamic image, or a combination thereof. In FIG. 1, a clock and icons are illustrated as examples of the image IM.

The display surface DS of the display device ED may include a display portion DA and a non-display portion NDA. The display portion DA may be a region of the display surface DS that displays the image IM. The display device ED may provide the image IM to a user through the display portion DA. The non-display portion NDA may be a region that does not display the image IM. The non-display portion NDA may have a color (e.g., a predetermined or selectable color) and may have a lower light transmittance than the display portion DA.

The non-display portion NDA may be adjacent to the display portion DA, and the shape of the display portion DA may be substantially defined by the non-display portion NDA. For example, the non-display portion NDA may surround the display portion DA. However, this is illustrative, and the non-display portion NDA may be disposed adjacent to only one side of the display portion DA, or may be disposed on a side surface rather than the front surface of the display device ED. According to an embodiment, the non-display portion NDA may be omitted.

In an embodiment, the display device ED may sense an external input applied from the outside. The external input may include various forms of inputs provided from outside the display device ED. For example, the external input may include force, pressure, temperature, light, or the like, or a combination thereof. The external input may include not only a touch input on the display device ED (e.g., a touch input by a hand of the user or a pen) but also an input (e.g., hovering) applied in proximity to the display device ED.

The display device ED may sense the external input applied to the front surface of the display device ED. However, a region of the display device ED where the external input is sensed may be defined on the side surface or a rear surface of the display device ED without being limited to the front surface of the display device ED.

The display device ED may include a folding region FA and at least one non-folding region NFA1 or NFA2. In FIG. 1, the display device ED including a first non-folding region NFA1 and a second non-folding region NFA2 is illustrated as an example. The folding region FA may be disposed between the first non-folding region NFA1 and the second non-folding region NFA2. For example, in the flat state, the first non-folding region NFA1, the folding region FA, and the second non-folding region NFA2 of the display device ED may be arranged in the second direction DR2.

The folding region FA may be a region that is flat or folded with a curvature depending on a folding operation. As illustrated in FIG. 1, the folding region FA may be flat in the display device ED in the flat state. The first and second non-folding regions NFA1 and NFA2 may be regions that remain flat in folded and unfolded states.

The folding region FA of the display device ED may be folded about a folding axis extending in a direction. For example, as illustrated in FIGS. 2A and 2B, the display device ED may be folded about a folding axis FX extending in the first direction DR1. The folding axis FX may extend in a direction parallel to long sides of the display device ED. However, without being limited thereto, the folding axis FX may extend in a direction parallel to short sides of the display device ED.

Referring to FIG. 2A, the folding axis FX may be defined over the front surface of the display device ED. The display surfaces DS (refer to FIG. 1) corresponding to the first and second non-folding regions NFA1 and NFA2 of the display device ED folded about the folding axis FX may face each other. The display device ED of FIG. 2A may be defined as the in-folded display device ED. In the in-folded display device ED, the rear surfaces of the display device ED that correspond to the first and second non-folding regions NFA1 and NFA2 may be opposite each other and may be exposed toward the outside. The display surface DS (refer to FIG. 1) corresponding to the folding region FA may be folded while forming a concavely curved surface.

Referring to FIG. 2B, the folding axis FX may be defined over the rear surface of the display device ED. The display surfaces DS corresponding to the first and second non-folding regions NFA1 and NFA2 of the display device ED folded about the folding axis FX may be opposite each other and may be exposed to the outside. The display device ED of FIG. 2B may be defined as the out-folded display device ED. In the out-folded display device ED, the rear surfaces of the display device ED that correspond to the first and second non-folding regions NFA1 and NFA2 may face each other. The display surface DS corresponding to the folding region FA may be folded while forming a convexly curved surface. As the display surface DS of the out-folded display device ED is exposed to the outside, the user may visually recognize the image IM even in the folded state.

Referring to FIGS. 2A and 2B, the folding region FA may be folded with a curvature (e.g., a predetermined or selectable curvature) and may have a radius of curvature R1. The distance DT between the first and second non-folding regions NFA1 and NFA2 may be substantially the same as twice the radius of curvature R1. However, without being limited thereto, the distance DT between the first and second non-folding regions NFA1 and NFA2 may be smaller than twice the radius of curvature R1. Accordingly, the folding region FA of an embodiment may be folded in a dumbbell shape when viewed in the first direction DR1.

The display device ED may be folded about the folding axis FX by a method selected from one of in-folding and out-folding. However, without being limited thereto, the display device ED may operate such that in-folding and out-folding are mutually repeated. In this embodiment, the display device ED is illustrated as being folded about the folding axis FX. However, the number of folding axes FX defined in the display device ED is not limited thereto. For example, the display device ED may be folded about multiple folding axes and may include folding regions spaced apart from each other.

Figure 3:
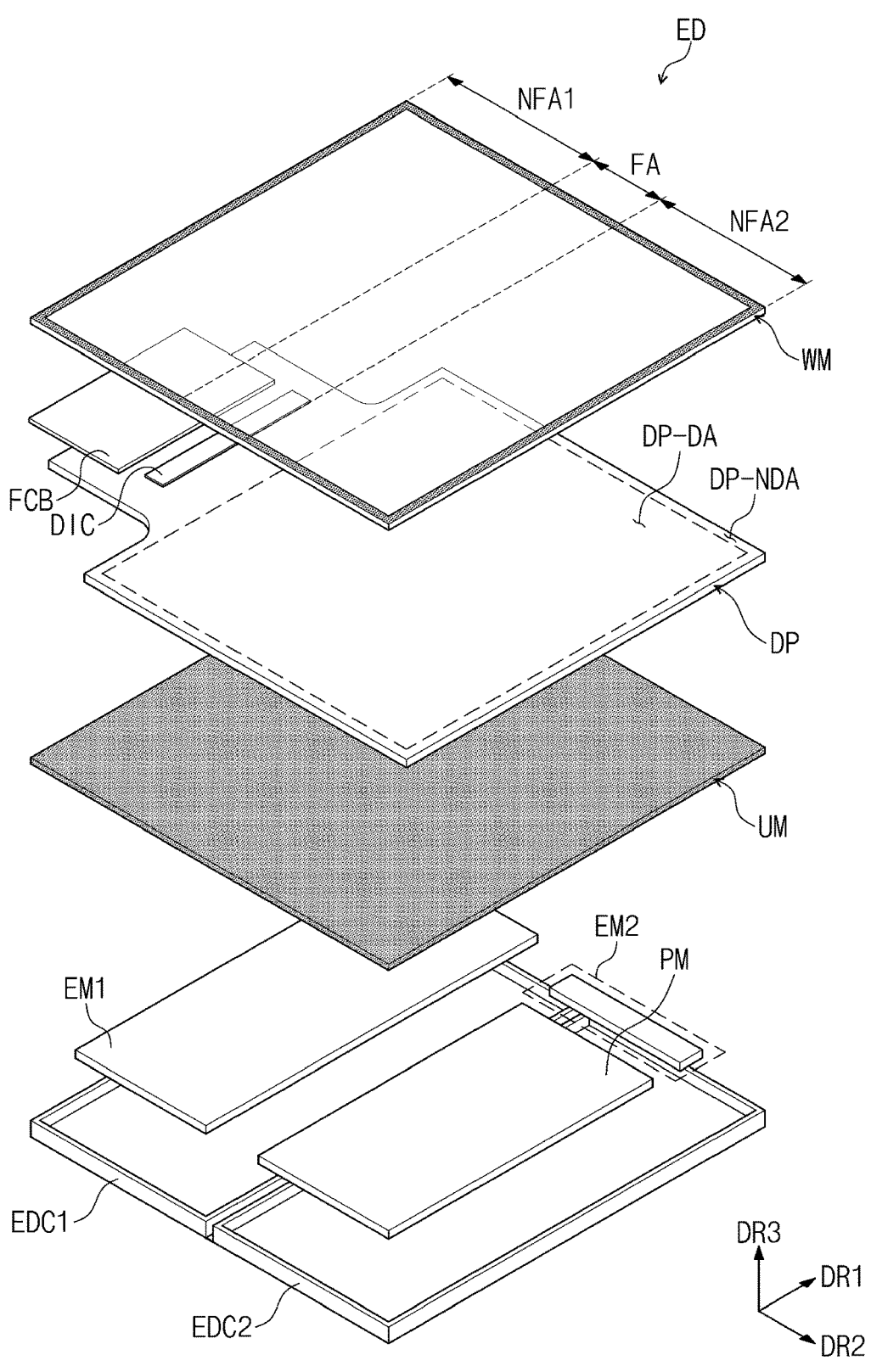
FIG. 3 is a schematic exploded perspective view of a display device according to an embodiment of the disclosure.

FIG. 3 is a schematic exploded perspective view of a display device ED according to an embodiment of the disclosure.

Referring to FIG. 3, the display device ED may include a window module WM, a display panel DP, a lower member UM, a first electronic module EM1, a second electronic module EM2, a power supply module PM, and cases EDC1 and EDC2. The display device ED may further include a mechanical structure (e.g., a hinge) for controlling a folding operation of the window module WM, the display panel DP, and the lower member UM.

The window module WM may provide the front surface of the display device ED. For example, a front surface of the window module WM may correspond to the front surface of the display device ED. The window module WM may transmit light generated from the display panel DP, and the user may visually recognize the image IM (refer to FIG. 1) on the window module WM.

The window module WM may include multiple layers for protecting the display panel DP. The window module WM may absorb an external impact applied to the display panel DP, or may protect the display panel DP from scratches. Detailed description about the layers included in the window module WM will be given below.

The display panel DP may generate the image IM (refer to FIG. 1) in response to an electrical signal. The display panel DP according to an embodiment may be an emissive display panel, but is not limited thereto. For example, the display panel DP may be an organic light emitting display panel, an inorganic light emitting display panel, or a quantum-dot light emitting display panel. An emissive layer of the organic light emitting display panel may include an organic light emitting material, and an emissive layer of the inorganic light emitting display panel may include an inorganic light emitting material. An emissive layer of the quantum-dot light emitting display panel may include quantum dots and quantum rods. Hereinafter, the display panel DP is illustrated as an organic light emitting display panel.

In FIG. 3, only the display panel DP is illustrated as a component disposed under the window module WM. However, the display device ED may further include components disposed above or under the display panel DP.

The display panel DP may include a display region DP-DA that displays the image IM (refer to FIG. 1) and a non-display region DP-NDA on which an image is not displayed. The display region DP-DA may correspond to the display portion DA (refer to FIG. 1) of the display device ED, and the non-display region DP-NDA may correspond to the non-display portion NDA (refer to FIG. 1) of the display device ED. The expression "a region/portion corresponds to a region/portion" used herein means that "the regions/portions overlap each other", but is not limited to having the same area and/or the same shape.

The display panel DP may include a data driver DIC disposed on the non-display region DP-NDA. The data driver DIC may include a data drive circuit for driving pixels of the display panel DP. The data driver DIC may be manufactured in the form of an integrated circuit chip and may be mounted on the non-display region DP-NDA of the display panel DP. The display device ED may further include a circuit board FCB electrically connected with the display panel DP on the non-display region DP-NDA. In FIG. 3, the data driver DIC disposed on the display panel DP is illustrated as an example. However, without being limited thereto, the data driver DIC may be mounted on the circuit board FCB.

The lower member UM may be disposed under the display panel DP. The lower member UM may overlap the folding region FA, the first non-folding region NFA1, and the second non-folding region NFA2. The lower member UM may be folded together as the display panel DP and the window module WM are folded. The lower member UM may have flexibility to correspond to the folding region FA and may have stiffness to correspond to the first non-folding region NFA1 and the second non-folding region NFA2.

The lower member UM may include a base part BS and support lines ML disposed inside the base part BS. The lower member UM may improve the impact resistance of the flexible display panel DP while having folding characteristics. Accordingly, the lower member UM may protect the display panel DP by absorbing an external impact applied toward a rear surface of the display panel DP. The lower member UM may minimize a crease in the display panel DP due to repeated folding operations. Components of the lower member UM will be described below in detail.

The power supply module PM, the first electronic module EM1, and the second electronic module EM2 may be disposed under the lower member UM. The power supply module PM and the first and second electronic modules EM1 and EM2 may be connected with each other through a separate flexible circuit board.

The power supply module PM supplies power required for overall operation of the display device ED. The power supply module PM may include a conventional battery module.

The first electronic module EM1 and the second electronic module EM2 may include various functional modules for operating the display device ED. The first electronic module EM1 and the second electronic module EM2 may be directly mounted on a mother board electrically connected with the display panel DP, or may be mounted on separate substrates and may be electrically connected to the mother board through connectors.

The first electronic module EM1 may include a control module, a wireless communication module, an image input module, a sound input module, a sound output module, a memory, and an external interface module.

The second electronic module EM2 may include a camera module, a proximity sensor, a biosensor for recognizing a part of the user's body (e.g., a fingerprint, an iris, or a face), or a lamp for outputting light. According to an embodiment, the second electronic module EM2 may receive or output an optical signal through a portion of the display region DP-DA of the display panel DP. However, without being limited thereto, the second electronic module EM2 may receive or output an optical signal through a portion of the non-display region DP-NDA.

The window module WM and the cases EDC1 and EDC2 may be coupled with each other to form an exterior of the display device ED and may provide an inner space in which components of the display device ED may be accommodated. For example, the cases EDC1 and EDC2 may accommodate the display panel DP, the first and second electronic modules EM1 and EM2, and the power supply module PM and may protect the accommodated components of the display device ED.

Figure 4:
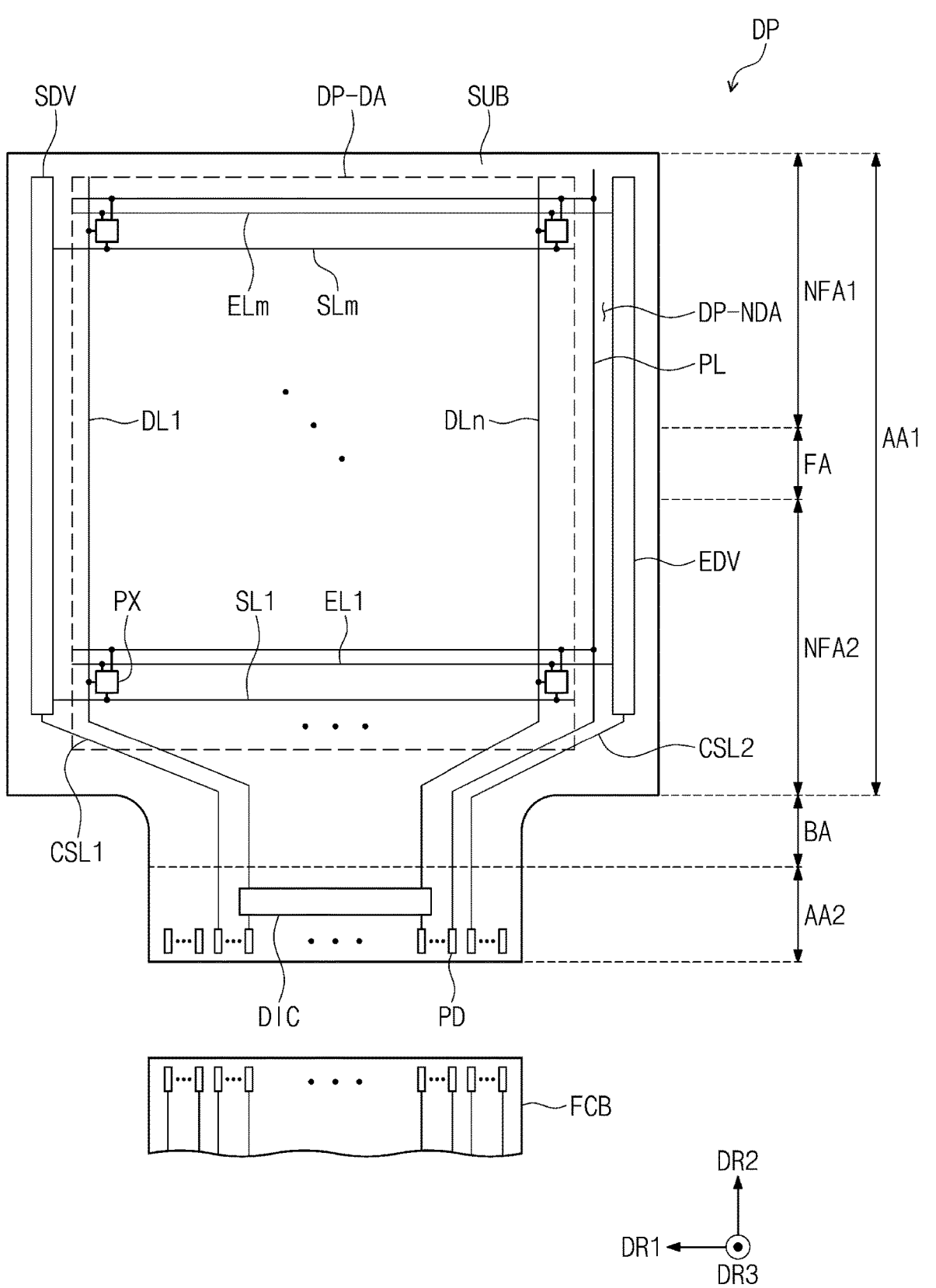
FIG. 4 is a schematic plan view of a display panel according to an embodiment of the disclosure.

FIG. 4 is a schematic plan view of a display panel DP according to an embodiment of the disclosure.

Referring to FIG. 4, the display panel DP may include a base substrate SUB, pixels PX, signal lines SL1 to SLm, EL1 to ELm, DL1 to DLn, CSL1, CSL2, and PL electrically connected to the pixels PX, a scan driver SDV, the data driver DIC, an emission driver EDV, and pads PD. The signal lines SL1 to SLm, EL1 to ELm, DL1 to DLn, CSL1, CSL2, and PL may include the scan lines SL1 to SLm, the data lines DL1 to DLn, the emission lines EL1 to ELm, the first and second control lines CSL1 and CSL2, and the power line PL. Here, "m" and "n" are natural numbers.

The base substrate SUB may provide a base surface on which elements and lines of the display panel DP may be disposed. The base substrate SUB may include a display region DP-DA and a non-display region DP-NDA. The display region DP-DA may be a region where an image is displayed by the pixels PX, and the non-display region DP-NDA may be a region that is disposed adjacent to the display region DP-DA and on which elements or lines for driving the pixels PX may be disposed.

The base substrate SUB may be a flexible substrate. The base substrate SUB may include a first panel region AA1, a second panel region AA2, and a bending region BA. The bending region BA may be disposed between the first panel region AA1 and the second panel region AA2, and the first panel region AA1, the bending region BA, and the second panel region AA2 may be arranged in the second direction DR2. However, the shape of the base substrate SUB in a plan view is not limited to that illustrated in the drawing and may be diversely changed depending on a structure of the display device ED (refer to FIG. 1).

The first panel region AA1 may include the display region DP-DA. The remaining first panel region AA1 other than the display region DP-DA, the bending region BA, and the second panel region AA2 may correspond to the non-display region DP-NDA.

The first panel region AA1 may include a first non-folding region NFA1, a folding region FA, and a second non-folding region NFA2. As the display device ED (refer to FIG. 1) is folded, the first panel region AA1 of the display panel DP may be folded about the folding axis.

The bending region BA may be a region that is bent with a curvature (e.g., a predetermined or selectable curvature) as the display panel DP is accommodated in the cases EDC1 and EDC2 (refer to FIG. 3). The bending region BA may be bent about a bending axis extending in the first direction DR1 such that the second panel region AA2 faces toward a rear surface of the first panel region AA1. The first panel region AA1 and the second panel region AA2 may overlap each other in a plan view by the bending of the bending region BA. The bending region BA may have a smaller width in the first direction DR1 than the first panel region AA1, and thus the bending region BA may be readily bent. However, embodiments are not necessarily limited thereto.

Each of the pixels PX may include a pixel drive circuit constituted by transistors (e.g., a switching transistor and a drive transistor) and a capacitor and a light emitting element electrically connected to the pixel drive circuit. The pixel PX may emit light in response to an electrical signal applied thereto.

The scan driver SDV, the data driver DIC, and the emission driver EDV may be disposed on the non-display region DP-NDA. In an embodiment, the scan driver SDV and the emission driver EDV may be disposed on the first panel region AA1, and the data driver DIC may be disposed on the second panel region AA2. However, the disclosure is not limited thereto. In an embodiment, at least one of the scan driver SDV, the data driver DIC, or the emission driver EDV may overlap the display region DP-DA, and thus the area of the non-display region DP-NDA of the display panel DP may be decreased.

Each of the pixels PX may be electrically connected to a corresponding one of the scan lines SL1 to SLm, a corresponding one of the data lines DL1 to DLn, and a corresponding one of the emission lines EL1 to ELm. More types of signal lines may be included in the display panel DP depending on the configuration of the pixel drive circuits of the pixels PX.

The scan lines SL1 to SLm may extend in the first direction DR1 and may be electrically connected to the scan driver SDV. The data lines DL1 to DLn may extend in the second direction DR2 and may be electrically connected to the data driver DIC. The emission lines EL1 to ELm may extend in the first direction DR1 and may be electrically connected to the emission driver EDV.

The power line PL may include a portion extending in the first direction DR1 and a portion extending in the second portion DR2. The portion of the power line PL that extends in the first direction DR1 and the portion of the power line PL that extends in the second portion DR2 may be disposed on different layers. However, without being limited thereto, the portion of the power line PL that extends in the first direction DR1 and the portion of the power line PL that extends in the second portion DR2 may be integral with each other and disposed on a same layer. The portion of the power line PL that extends in the first direction DR1 may be electrically connected to the pixels PX, and the portion of the power line PL that extends in the second portion DR2 may extend from the first panel region AA1 toward the second panel region AA2 via the bending region BA. The power line PL may receive a drive voltage and may provide the drive voltage to the pixels PX.

The first control line CSL1 may be electrically connected to the scan driver SDV and may extend toward a lower end of the second panel region AA2 via the bending region BA. The second control line CSL2 may be electrically connected to the emission driver EDV and may extend toward the lower end of the second panel region AA2 via the bending region BA.

The pads PD may be disposed adjacent to the lower end of the second panel region AA2. The pads PD may be disposed closer to a lower end of the display panel DP than the data driver DIC. The pads PD may be arranged in the first direction DR1. The pads PD may be portions electrically connected to the circuit board FCB.

The circuit board FCB may include a timing controller for controlling operations of the scan driver SDV, the data driver DIC, and the emission driver EDV and a voltage generator for generating a voltage. The circuit board FCB may be electrically connected to the pads PD and may transmit an electrical signal to the display panel DP through the pads PD.

Each of the pads PD may be electrically connected to a corresponding signal line. For example, the power line PL and the first and second control lines CSL1 and CSL2 may be electrically connected to corresponding pads PD. The data lines DL1 to DLn may be electrically connected to corresponding pads PD through the data driver DIC.

The scan driver SDV may generate scan signals in response to a scan control signal. The scan signals may be applied to the pixels PX through the scan lines SL1 to SLm. The data driver DIC may generate data voltages corresponding to image signals in response to a data control signal. The data voltages may be applied to the pixels PX through the data lines DL1 to DLn. The emission driver EDV may generate emission signals in response to an emission control signal. The emission signals may be applied to the pixels PX through the emission lines EL1 to ELm.

The pixels PX may receive the data voltages in response to the scan signals. The pixels PX may display an image by emitting light having luminance corresponding to the data voltages in response to the emission signals. Light emission time of the pixels PX may be controlled by the emission signals. Accordingly, the display panel DP may generate the image through the pixels PX disposed in the display region DP-DA.

Figure 5:
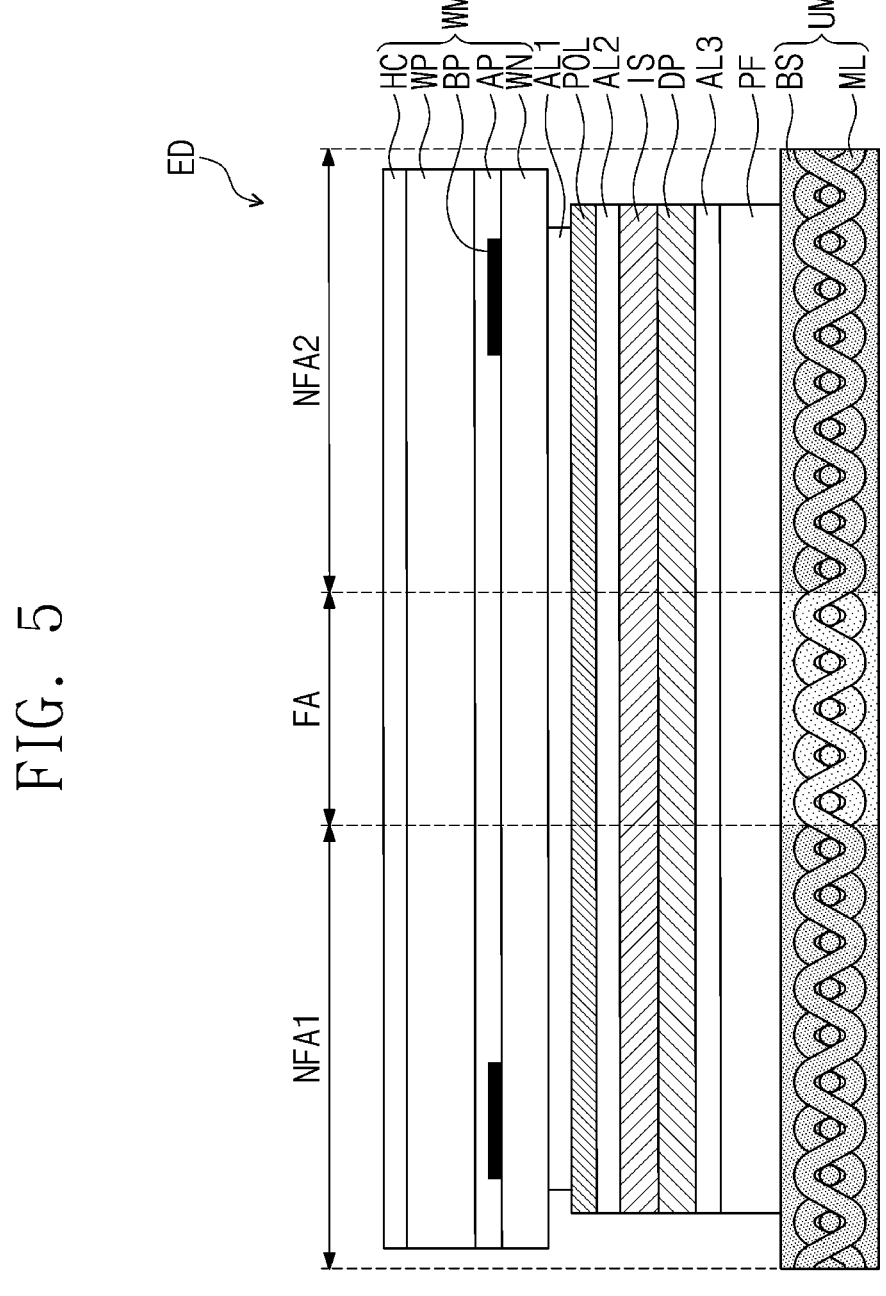
FIG. 5 is a schematic sectional view of a display device according to an embodiment of the disclosure.
Figure 5:
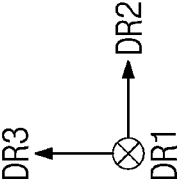

FIG. 5 is a schematic sectional view of a display device ED according to an embodiment of the disclosure. The above descriptions may be applied to components identical to the above-described components among components of the display device ED of FIG. 5.

Referring to FIG. 5, the display device ED may include the window module WM, an anti-reflector POL, an input sensor IS, the display panel DP, a protective film PF, and the lower member UM. The display device ED may include adhesive layers AL1, AL2, AL3, and AL4 that attach the components of the display device ED.

The window module WM may be disposed on the display panel DP and the anti-reflector POL and may protect the display panel DP and the anti-reflector POL. The window module WM may be folded with a curvature to correspond to the folding region FA. The window module WM may include a base film WN, an adhesive part AP, a window protection layer WP, a bezel pattern BP, and a functional coating layer HC.

The base film WN may be a support film on which the window protection layer WP and the functional coating layer HC may be disposed. Among the components of the window module WM, the base film WN may be disposed adjacent to the display panel DP in the thickness direction.

The base film WN may include an optically clear material. For example, the base film WN may include a glass film or a synthetic resin film, or a combination thereof. The synthetic resin film of the base film WN may include polyimide (PI), polyethylene terephthalate (PET), polyacrylate, polymethylmethacrylate (PMMA), polycarbonate (PC), polyethylene naphthalate (PEN), or a combination thereof. However, the material of the base film WN is not limited to the aforementioned examples.

The window protection layer WP may be disposed on the base film WN. The window protection layer WP may have a single-layer structure or a multi-layer structure. For example, the window protection layer WP having the multi-layer structure may include protective layers that have different flexural moduli and that are stacked each other in the thickness direction.

The window protection layer WP may include an organic material. For example, the window protection layer WP may include at least one of polyimide, polycarbonate, polymethyl methacrylate, polyethylene terephthalate, polyamide, triace-tylcellulose, thermoplastic polyurethane (TPU), thermoset polyurethane (TSU), polyether block amide (PEBA), or copolyester thermoplastic elastomer (COPE), or a combination thereof. However, the material of the window protection layer WP is not limited to the aforementioned examples.

The functional coating layer HC may be disposed on the window protection layer WP. The functional coating layer HC may be disposed at the top of the window module WM. The functional coating layer HC may be formed on an upper surface of the window protection layer WP by coating. Without being limited thereto, the functional coating layer HC may be attached to the window protection layer WP through an adhesive.

The functional coating layer HC may include at least one layer. For example, the functional coating layer HC may include at least one of a hard coating layer, an anti-finger-print layer, an antistatic layer, and an anti-contamination layer, or a combination thereof.

The functional coating layer HC may include a hard coating agent that includes at least one of an organic composition, an inorganic composition, or an organic-inor-ganic composite composition and may function as a hard coating layer. For example, the functional coating layer HC may include an acrylate-based compound, an epoxy-based compound, a siloxane-based compound, or a urethane-based compound, or a combination thereof. Accordingly, the func-tional coating layer HC may supplement the durability of the window module WM, may prevent scratches, and may provide a flat upper surface. The functional coating layer HC may include an anti-fingerprint coating agent such as a fluorine-containing compound and may function as an anti-fingerprint layer.

In some embodiments, the functional coating layer HC may simultaneously perform a hard coating function and an anti-fingerprint function. The functional coating layer HC may have a single-layer structure including both a hard coating agent and an anti-fingerprint coating agent, or may have a multi-layer structure in which a hard coating layer and an anti-fingerprint layer are stacked each other. Without being limited thereto, the functional coating layer HC may further include an anti-reflection agent or an anti-glare agent.

The bezel pattern BP may be disposed inside the window module WM. For example, the bezel pattern BP may be disposed on a surface of the base film WN. However, without being limited thereto, the bezel pattern BP may be disposed on a lower surface of the window protection layer WP. The bezel pattern BP may be formed by a method such as coating or printing. The bezel pattern BP may include a colored light-blocking film including a pigment or a dye. Accordingly, components of the display panel DP disposed to overlap the bezel pattern BP may be prevented from being visible from the outside. The region where the bezel pattern BP is disposed may correspond to the non-display portion NDA (refer to FIG. 1) of the display device ED.

The adhesive part AP may be disposed between the base film WN and the window protection layer WP and may couple the base film WN and the window protection layer WP. The adhesive part AP may include an optically clear adhesive. For example, the adhesive part AP may include a pressure sensitive adhesive (PSA) film, an optically clear adhesive (OCA) film, or an optically clear resin (OCR), or a combination thereof.

The anti-reflector POL may be disposed between the window module WM and the display panel DP. In an embodiment, the anti-reflector POL may be disposed between the window module WM and the input sensor IS. The anti-reflector POL may be coupled with the window module WM through the first adhesive layer AL1. The anti-reflector POL may decrease the reflectivity of external light incident toward the display panel DP from the outside. The anti-reflector POL may include various embodiments capable of decreasing the reflectivity of external light.

For example, the anti-reflector POL may include a polar-izer film. The polarizer film may include a phase retarder and/or a polarizer. The phase retarder may include a $\lambda/2$ phase retarder and/or a $\lambda/4$ phase retarder. The phase retarder and the polarizer may each be provided in a film type or a liquid crystal coating type. The film type polarizer may include a stretchable synthetic resin film, and the liquid crystal coating type polarizer may include liquid crystals arranged in pattern (e.g., a predetermined or selectable pattern). In an embodiment, the phase retarder and the polarizer may be implemented with a polarizer film.

In an embodiment, the anti-reflector POL may include color filters having an arrangement (e.g., a predetermined or selectable arrangement). For example, the color filters may be disposed to correspond to light emission colors of the pixels PX (refer to FIG. 4) included in the display panel DP. The anti-reflector POL may filter external light incident from above the display device ED into colors corresponding to the light emission colors of the pixels. The anti-reflector POL may further include a black matrix adjacent to the color filters.

The input sensor IS may be disposed on the display panel DP. The input sensor IS may be directly disposed on the display panel DP without a separate adhesive layer. For example, the input sensor IS may be formed, through a continuous process, on a base surface provided by the display panel DP. However, without being limited thereto, the input sensor IS may be formed through a process separate from that of the display panel DP and may be coupled with the display panel DP through an additional adhesive layer.

The input sensor IS may be disposed between the anti-reflector POL and the display panel DP and may be coupled with the anti-reflector POL through the second adhesive layer AL2. However, without being limited thereto, the second adhesive layer AL2 may be omitted, and the anti-reflector POL may be directly disposed on the input sensor IS without an adhesive layer. Furthermore, the stacking sequence of the anti-reflector POL, the input sensor IS, and the display panel DP is not limited to the illustrated embodi-ment. For example, the anti-reflector POL may be disposed between the display panel DP and the input sensor IS.

The input sensor IS may sense an external input applied from outside the display device ED and may obtain coor-dinate information of the external input. The input sensor IS may be driven by various methods, such as a capacitive detecting method, a resistive detecting method, an infrared detecting method, and a pressure detecting method, but is not limited to any one method.

The protective film PF may be disposed on the rear surface of the display panel DP. The protective film PF may be coupled to the rear surface of the display panel DP through the third adhesive layer AL3. However, without being limited thereto, the third adhesive layer AL3 may be omitted, and the protective film PF may be directly disposed on the rear surface of the display panel DP.

The protective film PF may prevent the display panel DP from being damaged by an external impact applied from below the display panel DP. The protective film PF may prevent a scratch on the rear surface of the display panel DP during a manufacturing process of the display panel DP. The protective film PF may include a synthetic resin layer. For example, the synthetic resin layer of the protective film PF may include at least one of polyamide or polyethylene terephthalate. However, the material of the protective film PF is not limited to the aforementioned examples.

The above-described first to third adhesive layers AL1, AL2, and AL3 may include an optically clear adhesive. For example, the first to third adhesive layers AL1, AL2, and AL3 may include a pressure sensitive adhesive film, an optically clear adhesive film, or an optically clear resin, or a combination thereof.

The lower member UM may be disposed on the rear surface of the display panel DP. For example, the lower member UM may be disposed under the protective film PF. The lower member UM may be directly disposed under the protective film PF, or may be attached to the protective film PF through a separate adhesive layer.

The lower member UM may include a base part BS and multiple support lines ML. The base part BS may overlap the first non-folding region NFA1, the second non-folding region NFA2, and the folding region FA. The base part BS may include portions that have different flexural moduli depending on regions where the portions are disposed. For example, a portion of the base part BS that corresponds to the folding region FA may have a lower flexural modulus than other portions of the base part BS that correspond to the first and second non-folding regions NFA1 and NFA2. A flexural modulus (or bending modulus) may identify a tendency of a material to resist bending. Accordingly, the lower member UM may have flexibility to correspond to the folding region FA and may have impact resistance to correspond to the first and second non-folding regions NFA1 and NFA2.

The base part BS may cover the support lines ML. The support lines ML may be disposed inside the base part BS. The base part BS may completely cover meandering upper and lower portions of the support lines ML and thus may provide a flat upper surface. Accordingly, the lower member UM may minimize a crease in the display panel DP and the window module WM that are disposed on the lower member UM and may improve the surface quality of the display device ED.

The base part BS may fill separation spaces between the support lines ML and may bring the support lines ML into close contact with each other. The filling of the separation spaces between the support lines ML may cause the base part BS to prevent deterioration in the impact resistance of the lower member UM.

Some of the support lines ML may substantially extend in the first direction DR1, and the other support lines ML may substantially extend in the second direction DR2. The support lines ML extending in the first direction DR1 and the support lines ML extending in the second direction DR2 may be interwoven with each other to form a mesh structure. Spaces (for example, openings) formed between the support lines ML interwoven with each other may improve the flexibility of the lower member UM and may prevent a crease in the display panel DP and the window module WM in the folding region FA.

The support lines ML extending in the second direction DR2 may extend from the first non-folding region NFA1 toward the second non-folding region NFA2 via the folding region FA. Accordingly, the support lines ML extending in the second direction DR2 may be disposed to pass through the portions of the base part BS that have different flexural moduli. Thus, the portions of the base part BS that have different flexural moduli may be prevented from be separated from each other, and the reliability of the lower member UM may be improved.

The support lines ML may include a material having a higher stiffness than the base part BS. Since the support lines ML disposed in the central portion of the lower member UM have a relatively high stiffness, the impact resistance of the lower member UM may be improved. An external impact applied to the bottom of the display device ED may be effectively distributed and absorbed by the support lines ML and the base part BS covering the support lines ML.

Since the lower member UM has the flexibility and the impact resistance, the lower member UM may serve as both a cushion layer that has porosity and absorbs an external impact and a metal plate that has stiffness and prevents deformation of the display device ED due to a folding operation. Accordingly, in the display device ED including the lower member UM of the disclosure, stacking a cushion layer and a metal plate on the rear surface of the display panel DP may be omitted, and a stacked structure under the display panel DP may be simplified. Since the support lines ML can be formed more readily than forming a flexible grid pattern on a metal plate to correspond to the folding region FA, a manufacturing process of the display device ED may be simplified.

An arrangement of the base part BS and the support lines ML included in the lower member UM will be described below in more detail with reference to drawings.

Figure 6A:
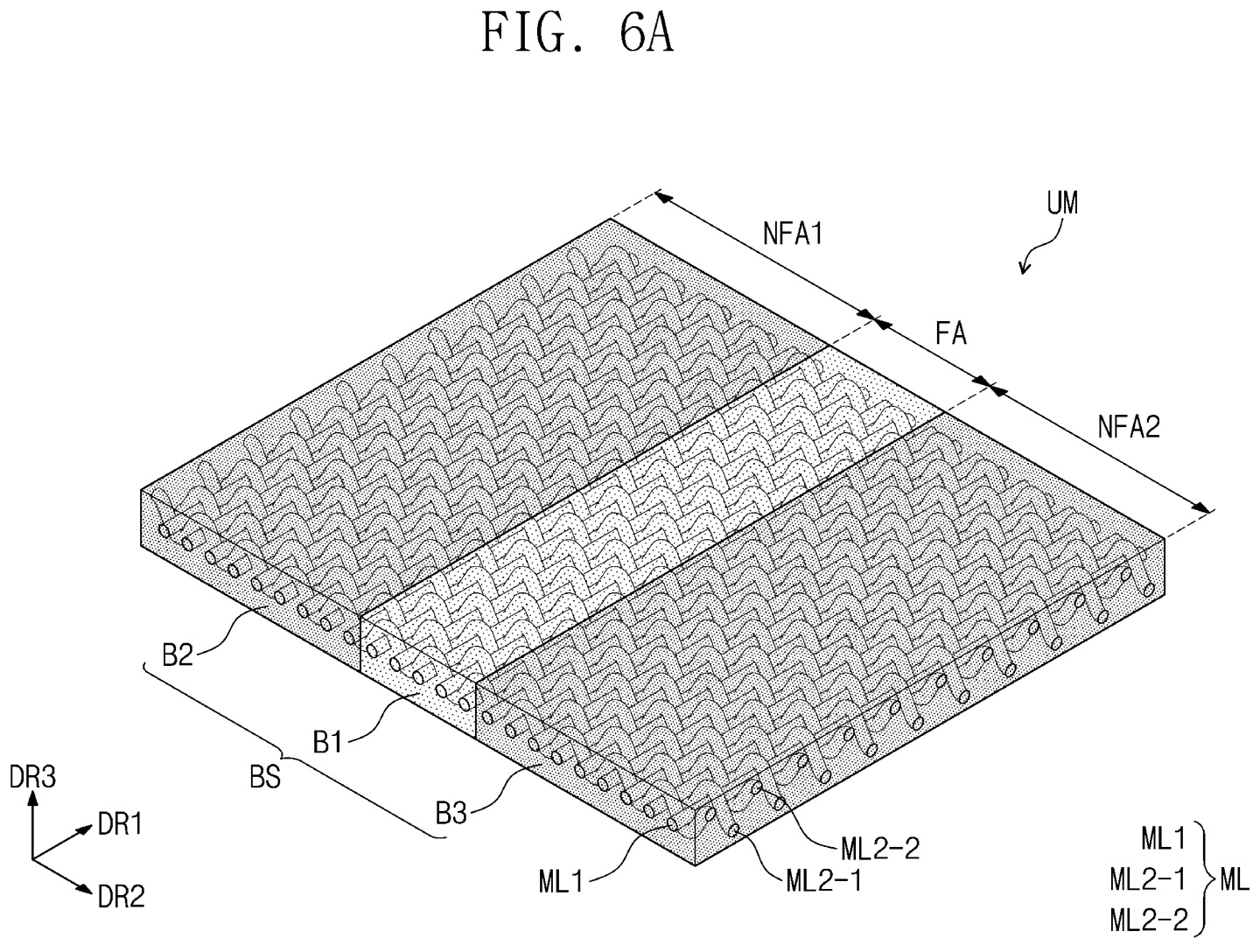
Figure 6B:
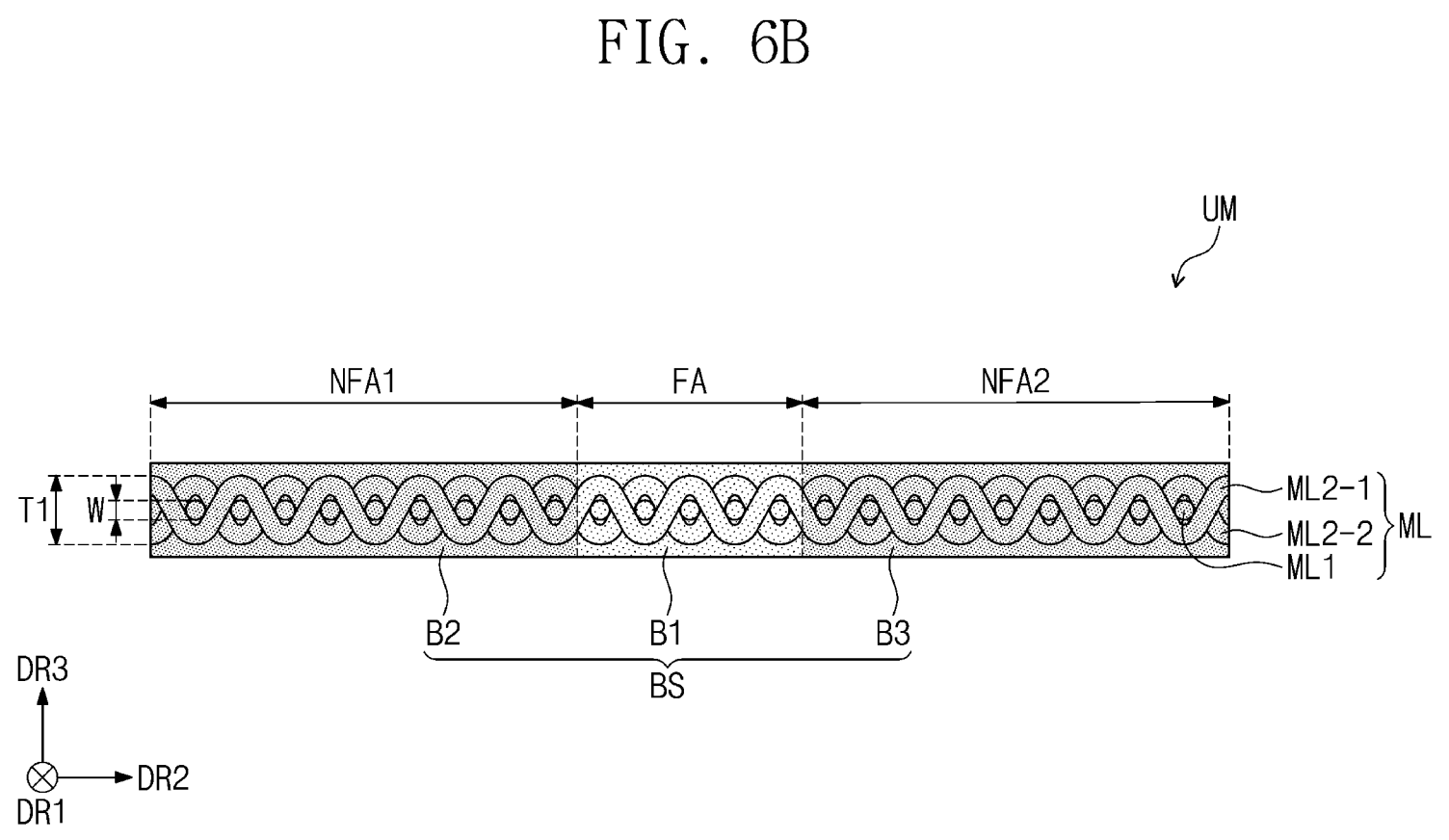
Figure 6C:
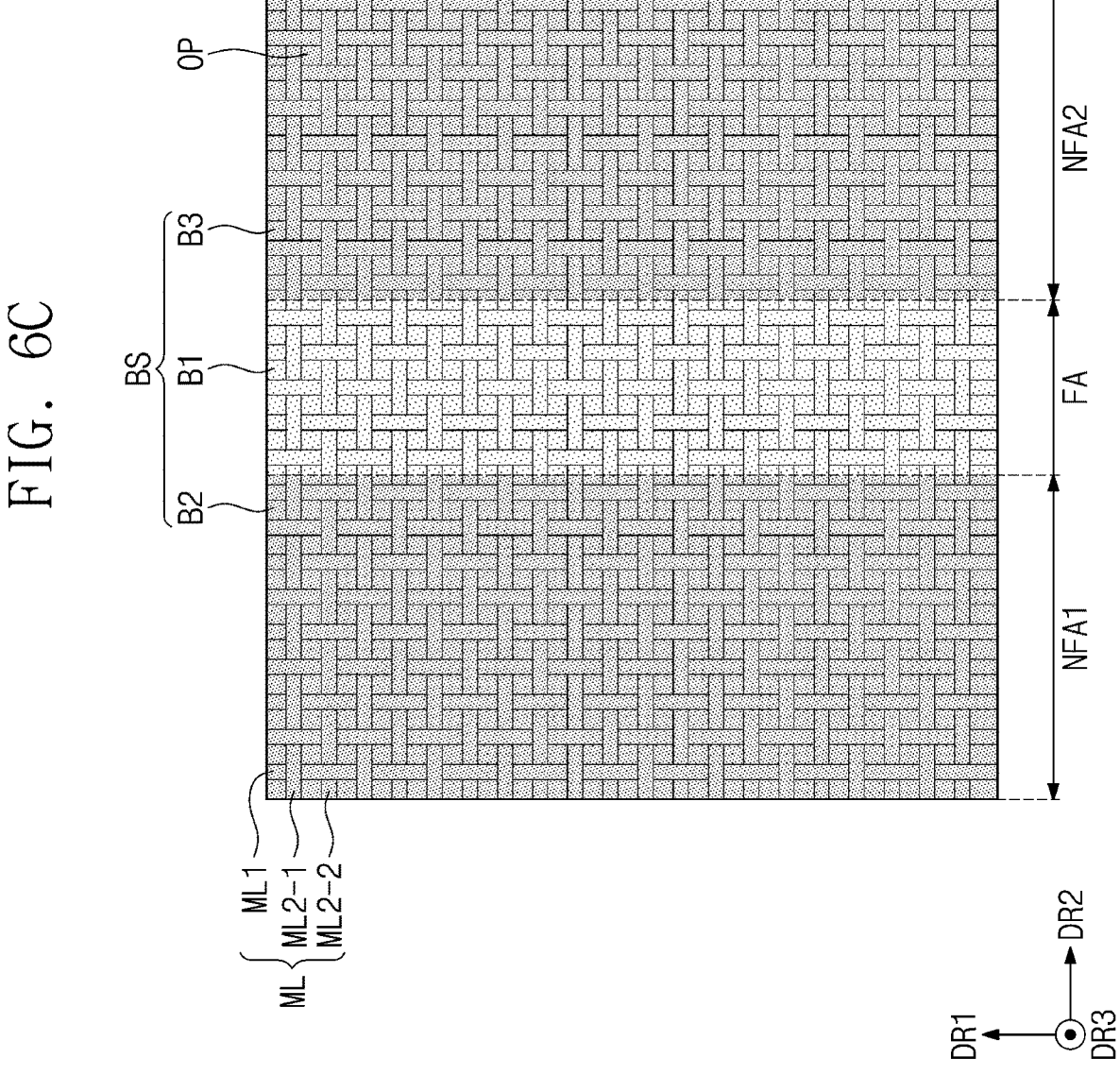
FIG. 6C is a schematic plan view of a lower member according to an embodiment of the disclosure.

FIG. 6A is a schematic perspective view of a lower member UM according to an embodiment of the disclosure. FIG. 6B is a schematic sectional view of a lower member UM according to an embodiment of the disclosure. FIG. 6C is a schematic plan view of a lower member UM according to an embodiment of the disclosure.

Referring to FIGS. 6A to 6C, the lower member UM may include the base part BS and the support lines ML. The above description may be applied to components illustrated in FIGS. 6A to 6C.

The base part BS may include first to third portions B1, B2, and B3 that make contact with each other and that are integral with each other. The first portion B1 of the base part BS may overlap the folding region FA. The second portion B2 and the third portion B3 of the base part BS may overlap the first non-folding region NFA1 and the second non-folding region NFA2, respectively. The first portion B1 may be disposed between the second portion B2 and the third portion B3 and may make contact with the second portion B2 and the third portion B3.

The first portion B1 may have a flexural modulus different from those of the second portion B2 and the third portion B3. The flexural modulus of the second portion B2 and the flexural modulus of the third portion B3 may be substantially the same as each other. The first portion B1 may have a lower flexural modulus than the second portion B2 and the third portion B3. Since the first portion B1 overlapping the folding region FA has a lower flexural modulus than the second portion B2 and the third portion B3, the base part BS and the lower member UM may have flexibility in the folding region FA. Since the second and third portions B2 and B3 overlapping the flat first and second non-folding regions NFA1 and NFA2 have higher flexural moduli than the first portion B1, the impact resistance of the base part BS and the lower member UM may be improved, and the display panel DP (refer to FIG. 5) may be protected from an external impact.

Each of the first to third portions B1, B2, and B3 may include a polymer resin. For example, each of the first to third portions B1, B2, and B3 may include a polyepoxy-based resin, a polyester-based resin, a polyamide-based resin, a polycarbonate-based resin, a polypropylene-based resin, a polybutylene-based resin, or a polyvinyl ester-based resin, or a combination thereof. However, the materials of the first to third portions B1, B2, and B3 are not limited to the aforementioned examples.

The first portion B1 may include a material different from those of the second portion B2 and the third portion B3. For example, the first portion B1 may include a material having a lower flexural modulus than that of the second portion B2. The second portion B2 and the third portion B3 may include a same material.

The first portion B1 may include the same polymer resin as the second portion B2 and the third portion B3, but may be formed under a curing condition different from those of the second portion B2 and the third portion B3. The flexural modulus of the polymer resin may vary depending on the degree of curing, and the degree of curing of the polymer resin may vary depending on temperature, UV irradiation time, heat application time, or the wavelength, illuminance, or energy of light. For example, in a case in which high-energy UV light is applied to the polymer resin or the polymer resin is exposed to UV light multiple times, the degree of curing may be improved, and thus the flexural modulus of the cured polymer resin may be increased. For example, the second portion B2 and the third portion B3 may be cured by UV light having higher energy than UV light applied to form the first portion B1, or may be exposed to UV light more times than the first portion B1 and thus may have a higher flexural modulus than the first portion B1. However, embodiments are not limited thereto.

Furthermore, the flexural modulus of a polymer resin may vary depending on an air-tightness of a surrounding environment in which the polymer resin is cured or an atmospheric environment. For example, the polymer resin of the first portion B1 may be cured in an environment having a high oxygen concentration. Due to this, the chain length of the polymer may be decreased, and thus the polymer resin may have a low flexural modulus. The polymer resins of the second portion B2 and the third portion B3 may be cured in an environment having a low oxygen concentration. Due to this, the chain length of the polymer may be increased, and thus the polymer resins of the second portion B2 and the third portion B3 may have a high flexural modulus. However, embodiments of the first to third portions B1, B2, and B3 are not limited thereto.

The lower member UM may further include a dye and a pigment dispersed in the base part BS. For example, the lower member UM may include a black pigment or a black dye dispersed in the base part BS. Accordingly, the lower member UM may have the function of a light blocking layer and may prevent a component disposed under the rear surface of the display panel DP or the lower member UM from being visible from the outside by reflected light.

The base part BS may further include inorganic particles dispersed in the polymer resin. The inorganic particles may include silica, barium sulphate, barium titanate, titanium oxide, sintered talc, zinc borate, zinc titanate, clay, alumina, mica, or boehmite, or a combination thereof. The inorganic particles may be dispersed in the entire region of the base part BS, for example, all of the first to third portions B1, B2, and B3. However, without being limited thereto, the inorganic particles may be dispersed in only the second portion B2 and the third portion B3 that correspond to the first and second non-folding regions NFA1 and NFA2.

The support lines ML may include first support lines ML1 and second support lines ML2-1 and ML2-2. Each of the first support lines ML1 may extend in the first direction DR1. The first support lines ML1 may be arranged to be spaced apart from each other in the second direction DR2. Each of the second support lines ML2-1 and ML2-2 may extend in the second direction DR2. The second support lines ML2-1 and ML2-2 may be arranged to be spaced apart from each other in the first direction DR1.

The first support lines ML1 and the second support lines ML2-1 and ML2-2 may intersect each other in a plan view: the crossings or intersections by first support lines ML1 and the second support lines ML2-1 and ML2-2 may define or create openings OP (refer to FIG. 6C). In other words, the first support lines ML1 and the second support lines ML2-1 and ML2-2 may be configured and arranged to define or create crossings that define or create openings OP. Hence, the first support lines ML1 and the second support lines ML2-1 and ML2-2 may cross (or intersect) each other and may define openings. OP The first support lines ML1 and the second support lines ML2-1 and ML2-2 may form a mesh structure defining the openings OP in a plan view. Since the first support lines ML1 and the second support lines ML2-1 and ML2-2 may be arranged to form the openings OP, the flexibility of the lower member UM may be improved. The base part BS may fill the openings OP. Accordingly, the impact resistance of the lower member UM may be prevented from being deteriorated by the openings OP.

The first support lines ML1 and the second support lines ML2-1 and ML2-2 may be disposed in the first non-folding region NFA1, the folding region FA, and the second non-folding region NFA2. The first support lines ML1 may be arranged in the second direction DR2 and may overlap the first non-folding region NFA1, the folding region FA, or the second non-folding region NFA2. The second support lines ML2-1 and ML2-2 may extend in the second direction DR2 and may overlap the first non-folding region NFA1, the folding region FA, and the second non-folding region NFA2. Each of the second support lines ML2-1 and ML2-2 may extend from the first non-folding region NFA1 toward the second non-folding region NFA2 via the folding region FA. For example, the second support lines ML2-1 and ML2-2 may be disposed inside the first to third portions B1, B2, and B3 of the base part BS.

The first support lines ML1 and the second support lines ML2-1 and ML2-2 may be interwoven with each other. The first support line ML1 may be alternately disposed over and under the second support lines ML2-1 and ML2-2 arranged in the first direction DR1. The second support line ML2-1 may be alternately disposed over and under the first support lines ML1 arranged in the second direction DR2.

As illustrated in FIG. 6B, the second support lines ML2-1 and ML2-2 may extend in the second direction DR2 while forming valleys and ridges (or peaks) on a vertical cross section in the first direction DR1. The valley of a second support line ML2-1 and the ridge of another second support line ML2-2 adjacent to the second support line ML2-1 in the first direction DR1 may be arranged in the first direction DR1. Furthermore, the ridge of the second support line ML2-1 and the valley of the other second support line ML2-2 may be arranged in the first direction DR1. Accordingly, the valleys and ridges of the second support lines ML2-1 and ML2-2 may be alternately arranged in the first direction DR1.

The first support lines ML1 may substantially extend parallel to the first direction DR1. The first support lines ML1 may be disposed to pass through the spaces between the valleys and ridges formed by the second support lines ML2-1 and ML2-2. For example, a first support line ML1 may extend through a lower portion of the ridge of a second support line ML2-1 and an upper portion of the valley of the other second support line ML2-2, where the second support lines ML2-1 and ML2-2 overlap each other in the first direction DR1. On a vertical cross section parallel to the extension direction of the first support lines ML1 (e.g., in the first direction DR1), the centers of sections of the first support lines ML1 may be aligned to be substantially parallel to the second direction DR2. Since the first support lines ML1 may be disposed via the spaces corresponding to the valleys and ridges of the second support lines ML2-1 and ML2-2, the support lines ML interwoven with each other may have a tensile force and may be readily folded in response to folding of the display device ED (refer to FIG. 5).

The first support lines ML1 and the second support lines ML2-1 and ML2-2 may have a circular or oval cross-section. The first support lines ML1 and the second support lines ML2-1 and ML2-2 may have a width W of several to tens of micrometers (μm). As illustrated in FIG. 6B, the thicknesses T1 of the first support lines ML1 and the second support lines ML2-1 and ML2-2 interwoven with each other may be about three times the widths W of the support lines ML. Accordingly, the thicknesses T1 of the support lines ML interwoven with each other may also be tens of micrometers (μm), and the lower member UM may have improved impact resistance even without having a large thickness.

The support lines ML may include a material having stiffness. For example, the support lines ML may include a metallic material such as stainless steel (SUS), titanium (Ti), aluminum (Al), nickel (Ni), or an alloy thereof. The support lines ML having stiffness may be disposed to correspond to the central portion of the lower member UM in the thickness direction and may improve the impact resistance of the lower member UM.

Figure 7A:
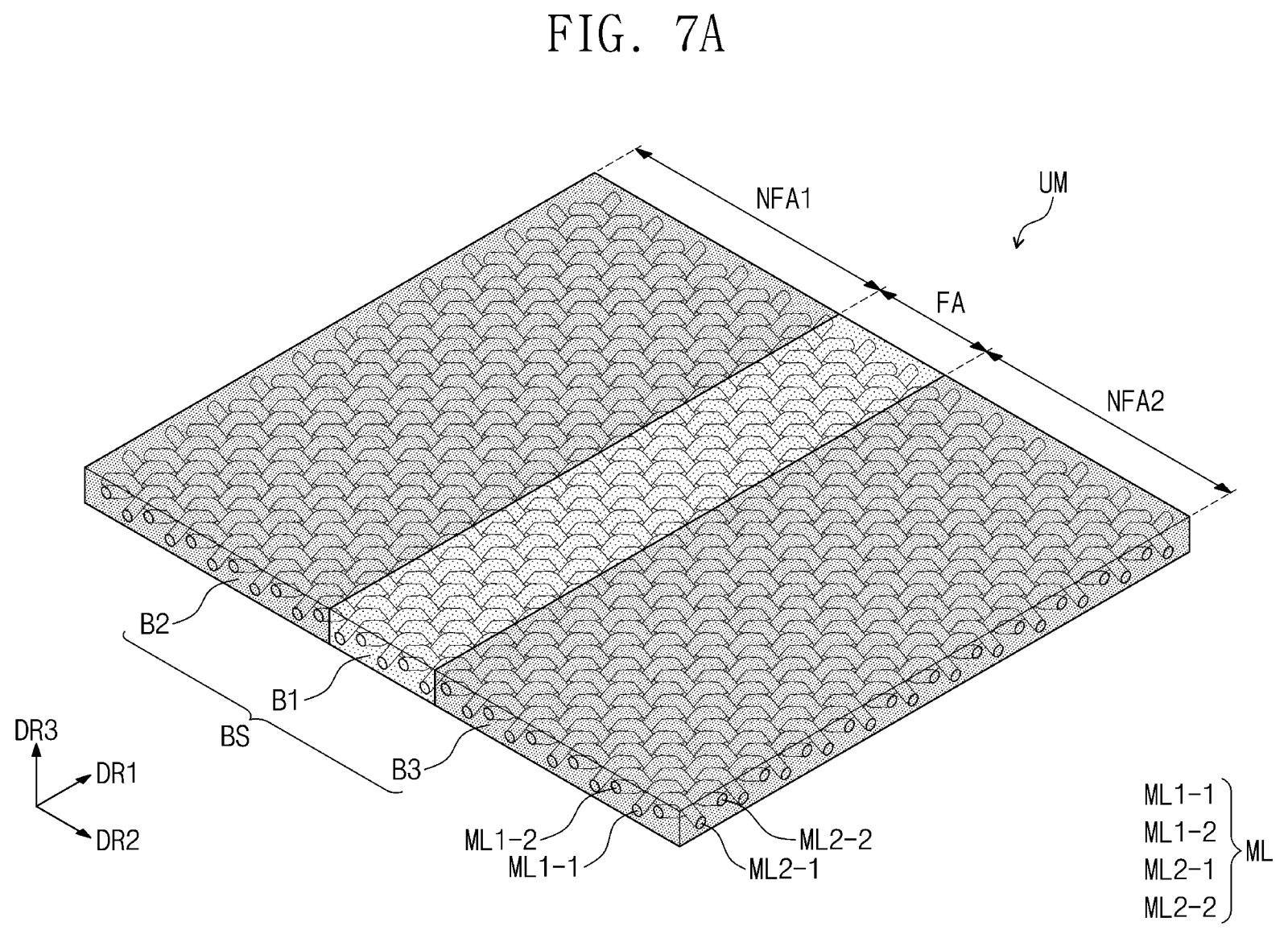
Figure 7B:
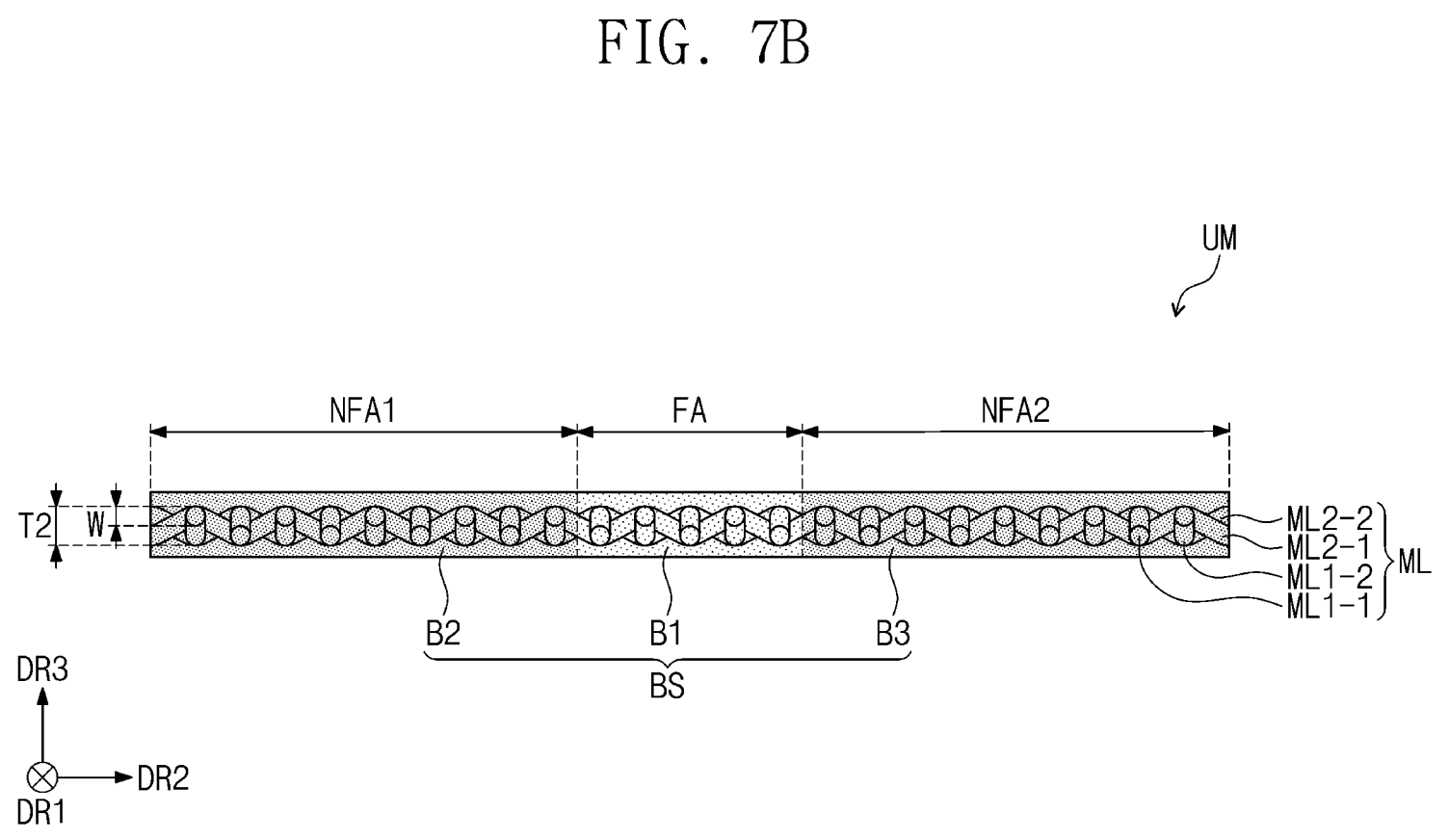

FIG. 7A is a schematic perspective view of a lower member UM according to an embodiment of the disclosure. FIG. 7B is a sectional view of a lower member UM according to an embodiment of the disclosure. The embodiment illustrated in FIGS. 7A and 7B and the embodiment illustrated in FIGS. 6A and 6B have substantially the same configuration, but differ from each other in terms of the form in which the support lines ML are interwoven with each other. The following description will be focused on the difference between the embodiments.

Referring to FIGS. 7A and 7B, the lower member UM may include the base part BS and the support lines ML. The above description may be applied to the base part BS, and description of the base part BS will hereinafter be omitted.

The support lines ML may include first support lines ML1-1 and ML1-2 and second support lines ML2-1 and ML2-2. Each of the first support lines ML1-1 and ML1-2 may extend in the first direction DR1. The first support lines ML1-1 and ML1-2 may be arranged to be spaced apart from each other in the second direction DR2. Each of the second support lines ML2-1 and ML2-2 may extend in the second direction DR2. The second support lines ML2-1 and ML2-2 may be arranged to be spaced apart from each other in the first direction DR1.

The first support lines ML1-1 and ML1-2 and the second support lines ML2-1 and ML2-2 may cross or intersect each other in a plan view and may define openings OP (refer to FIG. 6C) as in the embodiment illustrated in FIG. 6C. Since the openings OP (refer to FIG. 6C) may be formed between the first support lines ML1-1 and ML1-2 and the second support lines ML2-1 and ML2-2, the flexibility of the lower member UM may be improved. The base part BS may fill the openings OP (refer to FIG. 6C), and thus the impact resistance of the lower member UM may be prevented from being deteriorated by the openings OP.

The first support lines ML1-1 and ML1-2 may be arranged in the second direction DR2 and may overlap the first non-folding region NFA1, the folding region FA, or the second non-folding region NFA2. The second support lines ML2-1 and ML2-2 extending in the second direction DR2 may extend from a second portion B2 of the base part BS toward a third portion B3 via a first portion B1.

The first support lines ML1-1 and ML1-2 and the second support lines ML2-1 and ML2-2 may be alternately arranged in the first direction DR1 and the second direction DR2 respectively and forming a woven structure. The first support line ML1-1 may be alternately disposed over and under the second support lines ML2-1 and ML2-2 arranged in the first direction DR1. The second support line ML2-1 may be alternately disposed over and under the first support lines ML1-1 and ML1-2 arranged in the second direction DR2.

As illustrated in FIG. 7B, the second support lines ML2-1 and ML2-2 may extend while forming valleys and ridges on a vertical cross section taken along the second direction DR2 viewed in the first direction DR1. The valley of a second support line ML2-1 and the ridge of another second support line ML2-2 adjacent to the second support line ML2-1 in the first direction DR1 may be arranged in the first direction DR1. Furthermore, the ridges of the a second support line ML2-1 and the valleys of another second support line ML2-2 may be arranged in the first direction DR1. Accordingly, the valleys and ridges of the second support lines ML2-1 and ML2-2 may be alternately arranged in the first direction DR1.

The first support lines ML1-1 and ML1-2 may extend while forming valleys and ridges on a vertical cross section taken along the second direction DR2. The valley of a first support line ML1-1 and the ridge of another first support line ML1-2 adjacent to the first support line ML1-1 in the second direction DR2 may be arranged in the second direction DR2. Accordingly, the valleys and ridges of the first support lines ML1-1 and ML1-2 may be alternately arranged in the second direction DR2.

The valleys and ridges of the first support lines ML1-1 and ML1-2 may overlap the ridges and valleys of the second support lines ML2-1 and ML2-2, respectively. For example, the ridges of the first support line ML1-1 may overlap the valleys of a second support line ML2-1 overlapping the first support line ML1-1 in a third direction DR3. The valleys of the first support line ML1-1 may overlap the ridges of the second support line ML2-2 overlapping the first support line ML1-1 in a third direction DR3. Since the valleys and ridges of the first support lines ML1-1 and ML1-2 may be disposed to correspond to the ridges and valleys of the second support lines ML2-1 and ML2-2, the first support lines ML1-1 and ML1-2 and the second support lines ML2-1 and ML2-2 may be interwoven so as to be brought into close contact with each other.

On a vertical cross section parallel to the extension direction of the first support lines ML1-1 and ML1-2 (e.g., the first direction DR1), the centers of sections of the first support lines ML1-1 and ML1-2 may be disposed to be staggered with respect to each other in the second direction DR2. For example, the center of a section of first support line ML1-1 may be located below a center of a section of another first support line ML1-2 adjacent to the first support line ML1-1, such that the centers of the first support lines ML1-1 and ML1-2 are not aligned with the second direction DR2. Accordingly, a virtual line extending to the centers of sections of the first support lines ML1-1 and ML1-2 may have a zigzag form.

The first support lines ML1-1 and ML1-2 and the second support lines ML2-1 and ML2-2 may have a circular or oval cross-section. The first support lines ML1-1 and ML1-2 and the second support lines ML2-1 and ML2-2 may have a width W of several to tens of micrometers (μm).

As illustrated in FIG. 7B, the thicknesses T2 of the first support lines ML1-1 and ML1-2 and the second support lines ML2-1 and ML2-2 interwoven with each other may be about two times the widths W of the support lines ML. Since the first support lines ML1-1 and ML1-2 and the second support lines ML2-1 and ML2-2 may be interwoven so as to be brought into contact with each other, the support lines ML may be interwoven while having a small thickness. Accordingly, the lower member UM may have improved impact resistance even without having a large thickness.

The support lines ML may include a material having stiffness. For example, the support lines ML may include a metallic material such as stainless steel (SUS), titanium (Ti), aluminum (Al), nickel (Ni), or an alloy thereof. The support lines ML having stiffness may be disposed to correspond to the central portion of the lower member UM in the thickness direction and may improve the impact resistance of the lower member UM.

The flexibility, thickness, and impact resistance of the lower member UM may vary depending on the form in which the support lines ML are interwoven with each other. Compared to the support lines ML of FIGS. 7A and 7B, the support lines ML having the woven structure illustrated in FIGS. 6A and 6B may have a large thickness. However, the support lines ML having the woven structure illustrated in FIGS. 6A and 6B may have substantial flexibility due to the spaces between the support lines ML. Compared to the support lines ML of FIGS. 6A and 6B, the support lines ML having the woven shape illustrated in FIGS. 7A and 7B may have reduced tensile properties. However, the support lines ML having the woven shape illustrated in FIGS. 7A and 7B may be manufactured with small thickness, and the impact resistance thereof may be improved. The woven shape of the support lines ML of the lower member UM may be diversely changed and applied depending on characteristics of a product required by the display device ED (refer to FIG. 5).

Since the lower member UM of the disclosure includes the support lines ML interwoven with each other and the base part BS covering the support lines ML, a crease corresponding to the folding region FA may be minimized in the display panel DP disposed on the lower member UM.

The lower member according to the embodiment of the disclosure may include the base part including the portions having different flexural moduli and the support lines disposed inside the base part.

The base part according to the embodiment of the disclosure may have a low flexural modulus to correspond to the folding region and thus may be readily folded. The base part also may have a high flexural modulus corresponding to the non-folding regions and thus may have impact resistance.

The support lines according to the embodiment of the disclosure may be disposed in the base part to correspond to the folding region and the non-folding regions and thus may improve the adhesion of the base part including the portions having different flexural moduli. The support lines may form a mesh structure and may include a material having a stiffness (e.g., a predetermined or selectable stiffness). Thus, the support lines may allow the lower member to have impact resistance and folding characteristics and may minimize a crease in the display panel in the folding region.

Embodiments have been disclosed herein, and although terms are employed, they are used and are to be interpreted in a generic and descriptive sense only and not for purpose of limitation. In some instances, as would be apparent by one of ordinary skill in the art, features, characteristics, and/or elements described in connection with an embodiment may be used singly or in combination with features, characteristics, and/or elements described in connection with other embodiments unless otherwise specifically indicated. Accordingly, it will be understood by those of ordinary skill in the art that various changes in form and details may be made without departing from the spirit and scope of the disclosure as set forth in the following claims.

What is claimed is:

1. A display device comprising:
   a display panel including non-folding regions and a folding region disposed between the non-folding regions along a second direction intersecting a first direction; and
   a lower member disposed under the display panel, the lower member comprising:
      a base part including a plurality of portions having different flexural moduli; and
      support lines disposed inside the base part and intersecting each other in a plan view so as to define openings, and
   wherein the support lines are made of a different material than the base part,
   wherein the base part comprises:
      a first portion overlapping the folding region and made of a first solid material having a first flexural modulus, and
      a second portion and a third portion overlapping the non-folding regions, respectively, the second portion and the third portion made of a second solid material having a second flexural modulus,
   wherein the first flexural modulus of the first portion is lower than the second flexural modulus of each of the second portion and the third portion, and
   wherein the second solid material is spaced apart from a center line of the folding region extending in the first direction in plan view.

2. The display device of claim 1, wherein the base part comprises a polymer resin.

3. The display device of claim 1, wherein the support lines comprise at least one of stainless steel, titanium, aluminum, nickel, and an alloy thereof.

4. The display device of claim 1, wherein the support lines are disposed in a central portion of the base part in a thickness direction.

5. A display device comprising:
   a display panel including non-folding regions and a folding region disposed between the non-folding regions along a second direction intersecting a first direction; and
   a lower member disposed under the display panel, wherein
      the lower member comprises:

a base part including a plurality of portions having different flexural moduli; and support lines disposed inside the base part and intersecting each other in a plan view so as to define openings, wherein the support lines are made of a different material than the base part, wherein the support lines comprise:

first support lines, each extending in the first direction in plan view; and second support lines, each extending in the second direction in plan view, wherein the first support lines and the second support lines are not integrally formed with each other, wherein the first support lines and the second support lines form a mesh structure that overlaps the folding region and the non-folding regions, and wherein the support lines are spaced apart from surfaces of the base part defined along, a thickness direction of the base part intersecting the first direction and the second direction.

6. The display device of claim 5, wherein the first support lines and the second support lines are alternately arranged in the first direction and the second direction, respectively, to form a woven structure.

7. The display device of claim 6, wherein each of the second support lines forms valleys and ridges on a vertical cross section taken along the second direction and viewed in the first direction, and the valleys and ridges of the second support lines are alternately arranged in the first direction.

8. The display device of claim 7, wherein each of the first support lines is disposed through an upper portion of a valley and a lower portion of a ridge of second support lines overlapping each other among the second support lines.

9. The display device of claim 8, wherein each of the first support lines extends parallel to the second direction.

10. The display device of claim 9, wherein the first support lines comprise centers that are parallel to the second direction in the vertical cross section taken along the second direction.

11. The display device of claim 8, wherein each of the first support lines forms valleys and ridges on a vertical cross section taken along the first direction and viewed in the second direction.

12. The display device of claim 11, wherein the first support lines comprise centers that are adjacent to each other in the second direction and are not aligned with the second direction in the vertical cross section taken along the second direction.

13. The display device of claim 5, wherein the folding region is folded about a folding axis extending in the first direction.

14. The display device of claim 1, further comprising: a window module disposed on the display panel.

15. The display device of claim 1, further comprising: an input sensor disposed on the display panel and configured to sense an external input.

16. A display device comprising:

a display panel including a folding region and a non-folding region; and a lower member disposed on a rear surface of the display panel, the lower member comprising:

support lines overlapping the folding region and the non-folding region, the support lines forming a mesh structure; and a base part covering the support lines, and wherein the base part corresponding to the folding region has a lower flexural modulus than the base part corresponding to the non-folding region wherein the base part comprises:

a first portion overlapping the folding region and made of a first solid material having a first flexural modulus, and a second portion and a third portion overlapping the non-folding region, respectively, the second portion and the third portion made of a second solid material having a second flexural modulus, wherein the first flexural modulus of the first portion is lower than the second flexural modulus of each of the second portion and the third portion, and wherein the second solid material is spaced apart from a center line of the folding region extending in a first direction in plan view.

17. The display device of claim 16, wherein the support lines comprise at least one of stainless steel, titanium, aluminum, nickel, and an alloy thereof, the mesh structure overlaps the folding region and the non-folding region, and the support lines are made of a different material than the base part.

18. The display device of claim 16, wherein the support lines comprise: first support lines, each extending in the first direction, the first support lines arranged in a second direction intersecting the first direction; and second support lines, each extending in the second direction, the second support lines arranged in the first direction.

19. The display device of claim 18, wherein each of the second support lines forms valleys and ridges on a vertical cross section taken along the second direction and viewed in the first direction, and each of the first support lines is disposed through an upper portion of a valley and a lower portion of a ridge of second support lines overlapping each other in the first direction.

* * * * *